United States Patent [19]

Beardsley

[11] 4,438,620
[45] Mar. 27, 1984

[54] METHOD AND MEANS OF SERVICING AN OVERHEAD LIMB OF A GROWING PLANT

[76] Inventor: Paul F. Beardsley, Van Wert, Iowa 50262

[21] Appl. No.: 412,497

[22] Filed: Aug. 30, 1982

[51] Int. Cl.³ .......................................... A01D 46/24
[52] U.S. Cl. ...................................... 56/332; 56/333; 294/19 R
[58] Field of Search ................ 56/233, 238, 332, 333, 56/339, 328 R, 328 TS; 294/19 A

[56] References Cited

U.S. PATENT DOCUMENTS

| | | | |
|---|---|---|---|
| 76,248 | 3/1868 | Richardson | 294/19.1 |
| 2,542,665 | 2/1951 | Gustafson | 294/19.1 |
| 3,014,749 | 12/1961 | Carrow | 56/339 |
| 3,081,591 | 3/1963 | Coe | 56/339 |

FOREIGN PATENT DOCUMENTS 1584495  2/1981  United Kingdom ................ 56/295

Primary Examiner—Gene Mancene
Assistant Examiner—Cary E. Stone
Attorney, Agent, or Firm—Zarley, McKee, Thomte, Voorhees & Sease

[57] ABSTRACT

A tool for servicing an overhead limb is comprised of an elongated tube with a hook element on one end and a foot engaging chain on the other.

14 Claims, 3 Drawing Figures

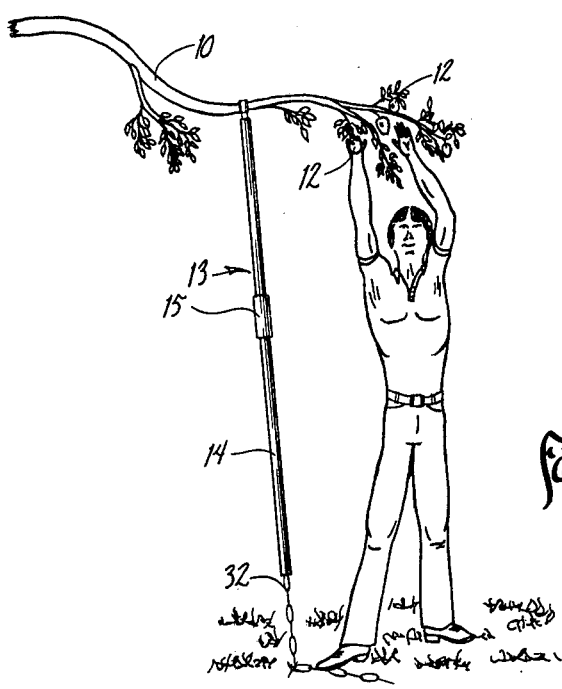
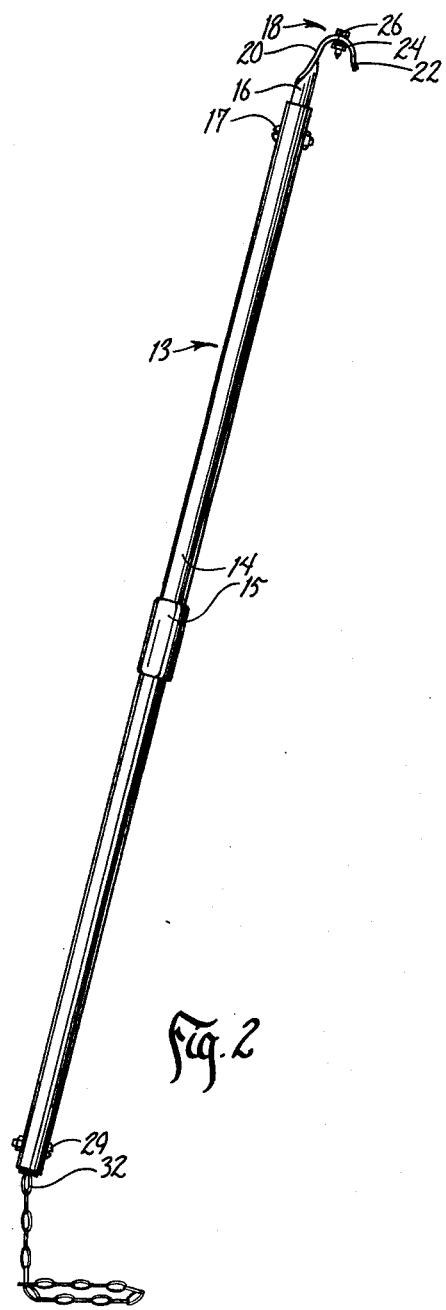
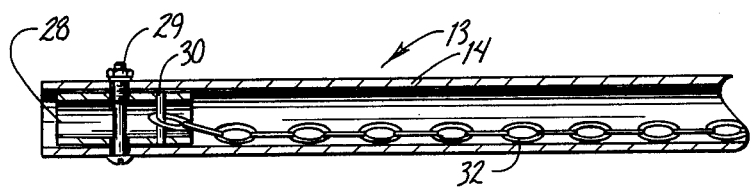
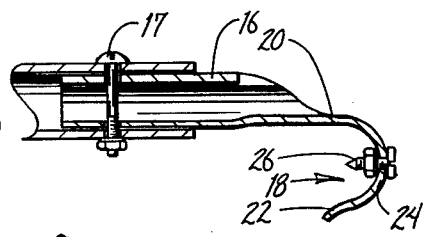

METHOD AND MEANS OF SERVICING AN OVERHEAD LIMB OF A GROWING PLANT

BACKGROUND OF THE INVENTION

Many devices have been designed to facilitate the picking of fruit and the trimming of trees and the like. These operations are often difficult because the limbs of such trees are often at elevations beyond the reach of persons servicing the trees.

Thus, a person servicing such a tree must either utilize means, such as a ladder or the like, to climb to the elevation of the limb, or must pull an overhead limb downwardly and hold it with one hand while servicing it with the other. My prior U.S. Pat. No. 4,228,870 illustrates a prior art device intended to permit a person to pick fruit from an elevated portion of a tree.

It is, therefore, a principal object of this invention to provide a method and means of servicing an overhead limb of a growing plant whereby both hands of the operator will be free to service the limb.

A further object of this invention is to provide a method and means of servicing an overhead limb of a growing plant which is completely safe, and which will normally permit the operator to stand on the ground surface.

A still further object of this invention is to provide a method and means of servicing an overhead limb of a growing plant that is easy to use and which employs means which is economical of manufacture.

These and other objects will be apparent to those skilled in the art.

BRIEF SUMMARY OF THE INVENTION

The apparatus of this invention comprises an elongated tube with a hook means on one end and a flexible chain on the other. A restriction element is located within the hook means to prevent the hook means from sliding on a limb.

The method of this invention involves engaging the hook means on the overhead limb, pulling the limb downwardly towards the ground; stepping on the chain means to hold the tube and the limb in a stabilized position, releasing the tube means and servicing the tree such as picking the fruit from a limb; and then releasing the hook means from the limb so that the limb can move upwardly to its original position.

BRIEF DESCRIPTION OF THE DRAWINGS

FIG. 1 is a perspective view of the device of my invention showing it in use as a tree limb is being serviced;

FIG. 2 is a side elevational view of the device of this invention shown at an enlarged scale; and FIG. 3 is an enlarged scale sectional view of the device of this invention.

DESCRIPTION OF THE PREFERRED EMBODIMENT

The numeral 10 designates the overhead limb of a fruit tree bearing fruit 12 such as apples, pears, plums, etc. The numeral 13 designates the tool of this invention which is comprised of an elongated member or tube 14 which preferably is in the order of five to six feet in length. A hand grip element 15 is frictionally positioned approximately midway on the length of tube 14.

A tube extension 16 (FIG. 3) is telescopically inserted into the upper end of tube 14 and is removably secured therein by nut and bolt assembly 17. Tube extension 16 terminates in a hook member 18 which is comprised of a leg 20, a leg 22, and a bite portion 24 which interconnects legs 20 and 22.

A retainer pin 26 is mounted on the bite portion 24. As best shown in FIG. 3, the retainer pin 26 can be comprised of a conventional screw which has its inner end sharpened to a point and which is held in place by a friction nut as the bolt extends through a suitable aperture in the bite portion 24. The retainer pin 26 serves the function of frictionally biting or engaging the upper portion of a limb upon which the hook member is positioned to prevent the hook member from sliding along the length of the limb.

A tube extension 28 is telescopically mounted in the lower end of tube 14 as best shown in FIG. 3. The tube extension 28 is removably mounted within tube 14 by nut and bolt assembly 29. A cross pin 30 extends through tube extension 28 and is rigidly secured to the tube extension. The cross pin 30 extends through the end link in chain 32. The chain 32 and tube extension 28 are shown in a storage position in FIG. 3. By removing the nut and bolt assembly 29, withdrawing the tube extension 28 from tube 14, reversing its position, and reinserting into the tube 14, and reassembling nut and bolt assembly 29, the chain 29 is transformed from a storage position to an operative position.

The tool 13 in operation is used as follows: The operator grasps the tube by the tube grip 15 and engages an overhead limb 10 within the hook portion 18. By exerting downward force on the tube 14, the retainer pin 26 effectively grips the limb and the limb is then pulled downwardly within the manual reach of the operator.

At that point, the operator steps on the chain 32 and binds it between his foot and the ground surface. This serves to stabilize the position of the tool 13 and the limb 10. The operator then releases his grasp on the tool 13 and picks the fruit or trims the limb as the case may be.

After the limb has been serviced, the operator grasps the tool 13 again, releases his contact with the chain 32, and allows the limb to move upwardly to its original position. The hook member 18 is then released from the limb by merely elevating it slightly above the level of the limb, and the operator then merely repeats this activity with regard to another limb of the tree.

It should be understood that the method and means of this invention take advantage of the inherent resiliency of the limb being serviced, for it is the upward force on the tool exerted by the limb that holds the tool erect as the limb is being serviced.

It is seen that the method and device of this invention provide a very simple and efficient way to service an overhead limb of a tree in a very efficient, safe and inexpensive manner. Thus, it is seen that this invention achieves at least its stated objectives.

I claim:

1. The method of servicing an overhead limb of a growing plant, comprising,
   taking an elongated member with a hook means on one end and a foot engaging means on the other,
   standing on a supporting surface and manually lifting said elongated member upwardly to engage said hook means on said limb to be serviced,
   lowering said elongated member and pulling and bending said limb downwardly to a lower positon to permit manual servicing thereof, stepping on said foot engaging means to stabilize said elongated member and said limb and to prevent said limb from raising said elongated member, manually releasing said elongated member while maintaining stepping engagement with said foot engaging means, manually servicing said limb, and releasing said foot engaging means, and disengaging said hook means from said limb to permit the serviced limb to rise to its original position.

2. The method of claim 1 wherein said elongated member is manually grasped after servicing of said limb is completed and before said serviced limb rises to its original position.

3. The method of claim 1 wherein foot engaging means is held against said supporting surface while said limb is being serviced.

4. The method of claim 1 wherein said elongated member is positioned in a substantially vertical position while said limb is being serviced.

5. The method of claim 1 wherein said elongated member is manually grasped after said limb is serviced and before said foot engaging means is released, and said limb is permitted to resume its original elevated position with said hook means engaged therewith, whereupon said hook means is released from said limb approximately at the time said limb assumes its original position.

6. A tool for reaching, positioning and holding overhead limbs of growing plants for servicing, comprising, an elongated member having opposite ends, a hook means on one end of said elongated member for releasably grasping and holding a limb, and a foot engaging means on the other end of said elongated member to permit an operator's foot to hold said elongated member and a limb grasped by said hook means in a stabilized position by exerting downward force on said foot engaging means, whereupon both hands of the operator are free to service said limb.

7. The tool of claim 6 wherein said foot engaging means is a flexible member adapted to rest on a supporting surface when the other end of said elongated member is adjacent said supporting surface.

8. The tool of claim 6 wherein said foot engaging means is a chain secured to the other end of said elongated member.

9. The tool of claim 8 wherein said elongated member is a hollow pipe, and means are connected to said other end of said pipe for permitting storage of said chain within said pipe.

10. The tool of claim 6 wherein said hook means is an inverted U-shaped hook element having two legs interconnected by a bite portion, with one of said legs being connected to said one end of said elongated member.

11. The tool of claim 6 wherein said hook means includes friction means for frictionally engaging a limb engaged by said hook means to prevent said limb from longitudinally moving with respect to said hook means.

12. The tool of claim 11 wherein said friction means is a sharpened pin.

13. The tool of claim 7 wherein said flexible member is connected to a tube element, said elongated member being hollow at least at said other end, said tube element telescopically positioned within the hollow other end of said elongated member, said flexible member extending from said elongated member when said tube element is in a first position within said elongated member, and said flexible member being confined within said elongated member when said tube element is moved to a second position within said elongated member.

14. The method of claim 2 wherein said hook means is held against sliding movement with said limb as said limb is moved to said lower position.

* * * * *